Aug. 13, 1963 R. M. WOLFE 3,100,887
FERROELECTRIC SHIFT REGISTER
Filed April 4, 1960
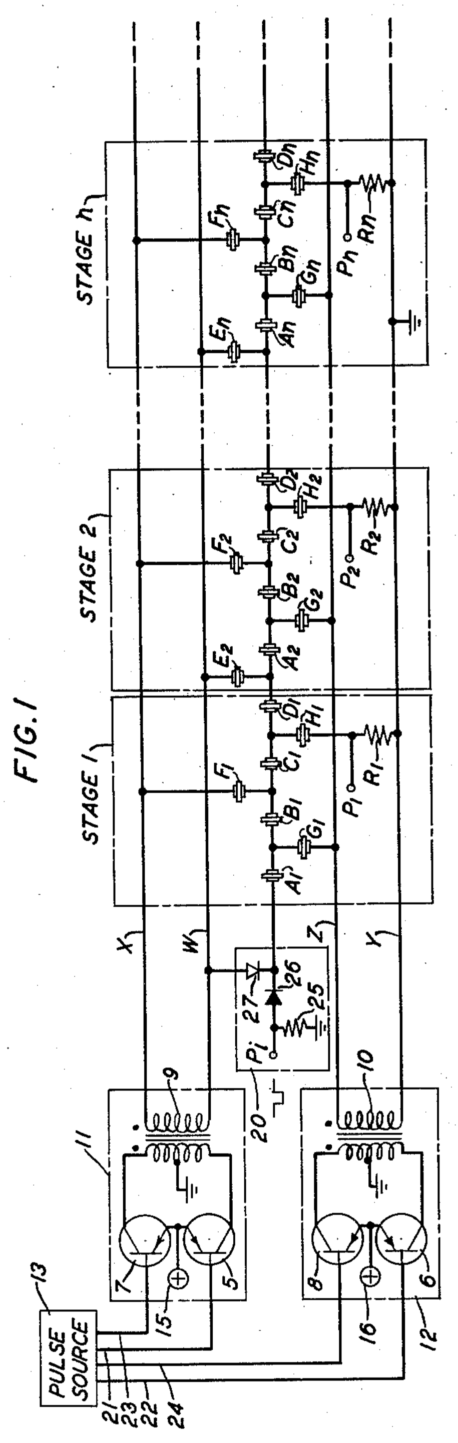
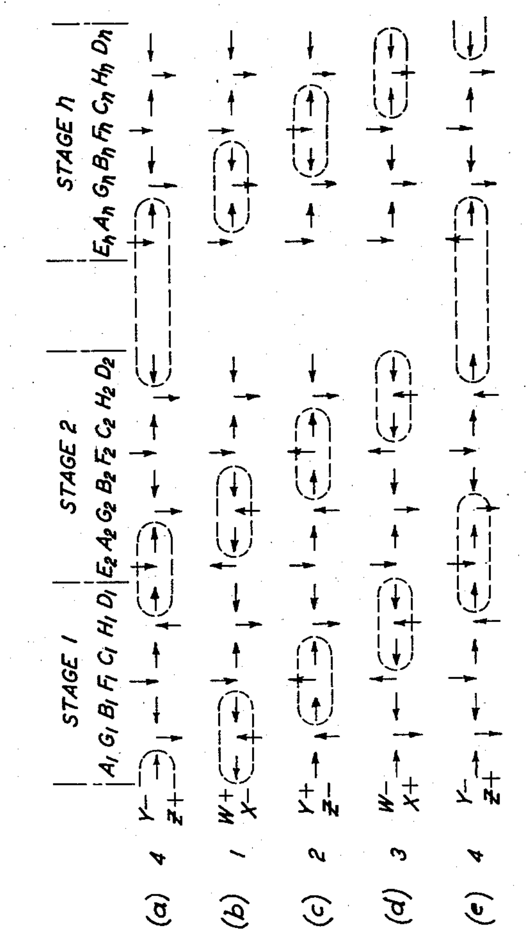
FIG. 3
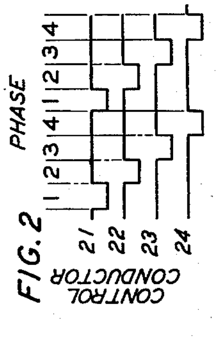
INVENTOR
R. M. WOLFE
BY Kenneth B. Hamlin
ATTORNEY 3,100,887

FERROELECTRIC SHIFT REGISTER

Robert M. Wolfe, Colonia, N.J., assignor to Bell Telephone Laboratories, Incorporated, New York, N.Y., a corporation of New York Filed Apr. 4, 1960, Ser. No. 19,640
14 Claims. (Cl. 340—173.2)

This invention relates to shift register circuits and more particularly to those of the type utilizing ferroelectric capacitors as the storage elements.

Ferroelectric shift registers of the type in which stored information signals are shifted progressively from stage to stage, and in which capacitors including a dielectric material having the characteristic of remanent polarization of electrostatic dipoles are used as the storage elements, may have wide application in systems dealing with binary information or the binary treatment of information, among which systems are computers, telephone systems, logic circuitry and the like.

The remanent polarization existing in ferroelectric capacitors constitutes the means whereby the storage of binary information is rendered possible. This characteristic is found in certain crystalline structures, such as barium titanate or guanidinium aluminum sulphate hexahydrate, which exhibit a substantially rectangular hysteresis loop curve as the pilot of charge corresponding to applied voltage or charge displacement versus electric field. Normal ferroelectric crystals, initially uniformly polarized by the application of an external voltage of a given polarity to the terminals of the capacitor of which the crystal is the dielectric, store an equivalent charge in the alignment of the electric dipoles within the dielectric. This dipole alignment remains when the applied voltage is removed, providing the remanent polarization and accounting for the hysteresis loop plot. If a voltage of opposite polarity is applied and then removed, the dipole alignment is established in the opposite direction and a value of charge remains which is negative to the previous value of charge. During the reversal of polarization a comparatively large change of charge in the capacitor occurs, thus producing a large value of effective capacitance. If, however, a voltage is applied which is opposite in polarity to that which would switch the electric dipoles, very little charge is stored and the effective capacitance of the unit is comparatively small. A normal ferroelectric capacitor can be an effective storage element for binary information since it possesses two stable states of remanent dielectric polarization and the existing state can be determined by applying a read-out pulse, among other methods, to test the impedance and thereby the effective capacitance of the device.

Normal ferroelectric capacitors, described above, have the hysteresis loop arranged substantially symmetrically about the point of zero applied voltage. Thus when a voltage source is removed from such a capacitor the device maintains the state of polarization to which it was last switched.

By contrast certain ferroelectric crystals, such as guanidinium aluminum sulphate hexahydrate, for example, have the property of an internal bias exhibited by a shift of the hysteresis loop along the voltage axis. This property has been described in an article entitled "Properties of Guanidine Aluminum Sulfate Hexahydrate and Some of Its Isomorphs," by A. N. Holden, W. J. Merz, J. P. Remeika, and B. T. Matthias, appearing in the Physical Review, volume 101, second series, No. 3, at page 962. In such crystals only one stable state of polarization exists for the case of no applied voltage although, if a proper polarity voltage of amplitude sufficient to overcome the effective internal bias in addition to the normal switching voltage is applied, the electric dipoles switch to a second state which is stable only as long as the applied voltage remains. When it is removed, the dipoles switch spontaneously from the conditionally stable state to that state corresponding to zero applied voltage. Like normal ferroelectric capacitors, internally biased ferroelectrics exhibit a comparatively high capacitance and, therefore, low impedance, during dipole switching, while the capacitance is low and the impedance high when switching is not taking place.

A ferroelectric shift register with normal ferroelectric capacitors as storage elements is disclosed in Patent Number 2,876,435 of J. R. Anderson which issues March 3, 1959. The suitability of such a circuit to the rapid and compact storage of information is readily apparent. The use of internally biased ferroelectric capacitors in shift registers is disclosed in Patent Number 2,839,738 of R. M. Wolfe which issued June 17, 1958. Until now ferroelectric shift registers have required the use of resistors and diodes with a complex driving arrangement or internally biased ferroelectric capacitors with diodes and resistors combined with a drive source generating offset drive pulses. One disadvantage of these ferroelectric shift registers is that the use of resistors and diodes or internally biased ferroelectric capacitors has precluded full utilization of economical manufacturing techniques to make a shift register from one sheet of ferroelectric material. In addition, another disadvantage of the prior art circuits is that the resistors and diodes consume additional power. The use of resistors and semiconductor elements tends to decrease the reliability of the shift registers. It is apparent as a further disadvantage that their relative size is larger than desirable for many purposes.

Therefore it is a general object of this invention to provide an improved ferroelectric shift register. A more particular object of this invention is to reduce the size of such a shift register.

A further object of this invention is to permit the use of simplified fabricating and manufacturing techniques and thereby reduce the cost of such shift register circuits.

A further object of this invention is to provide a more reliable shift register having a smaller incidence of failure and for which a minimum amount of electrical power is required for operation.

These and other objects are attained in a specific illustrative embodiment of the invention which comprises a shift register having a plurality of stages interconnected by two pairs of drive leads. Each stage of the shift register comprises eight normal ferroelectric capacitors, four of which are utilized as storage capacitors and four of which are utilized as gating capacitors. The four storage capacitors in each stage are connected in series and in series with the series connected storage capacitors of the other stages. Each of the gating capacitors of the shift register is connected between an associated one of the drive leads and the junction between a pair of adjacent storage capacitors. The gating capacitors are utilized to gate voltages of predetermined magnitude and polarity to the respective storage capacitors to control the polarization thereof and effect the storage, shifting and read-out of binary information in the shift register. The storage capacitors are utilized in pairs to store binary information, with the polarization of a pair of adjacent storage capacitors in the same direction representing a binary "1" and the polarization of a pair of adjacent capacitors in the opposite direction representing a binary "0." Initially the adjacent storage capacitors are polarized in opposite directions so that each pair of storage capacitors is polarized to correspond to a binary "0." Binary "1" information is entered in the shift register by switching the polarization of the first storage capacitor of the first pair of the first stage to correspond to the direction of polarization of the second storage capacitor of the first stage thus storing a binary "1" in the first pair of storage capacitors.

Identifying the four serially connected storage capacitors in each stage of the shift register as A, B, C and D, respectively, then capacitors A and B and, similarly, capacitors C and D in each stage are polarized in opposite directions to store binary "0's." A binary "1" is stored in the shift register by switching the direction of polarization of one of the storage capacitors of a pair to correspond to the direction of polarization of the other capacitor of the pair.

The shifting of information from one stage to the next adjacent stage, in accordance with the present invention, is attained in four phases. In the first phase a voltage pulse of predetermined magnitude and polarity is applied to the first pair of the drive leads, which voltage pulse is gated through the associated gating ferroelectric capacitors to reverse the polarization of storage capacitors A and B in each stage. Thus the polarization of capacitors A and B is switched to correspond to the direction of polarization of storage capacitor C and binary "1" information previously stored in capacitors A and B is shifted to storage capacitors B and C. In the second phase a voltage pulse of predetermined polarity and magnitude is applied to the second pair of drive leads to reverse the direction of polarization of capacitors B and C to correspond to the direction of polarization of capacitor D, and thus the binary "1" previously stored in storage capacitors B and C is shifted to storage capacitors C and D. In the third phase a voltage pulse of opposite polarity to that previously applied during phase 1 is applied to the first pair of drive leads to reverse the direction of polarization of storage capacitors C and D to correspond to the direction of polarization of storage capacitor A of the next succeeding stage, and the binary "1" information previously stored in storage capacitors C and D is shifted to storage capacitor D of the particular stage and capacitor A of the next succeeding stage. During the final phase a voltage pulse of opposite polarity to that applied during phase 2 is applied to the second pair of drive leads to reverse the direction of polarization of storage capacitor D of the particular stage and storage capacitor A of the next succeeding stage to correspond to the direction of polarization of storage capacitor B of the succeeding stage, and thus the binary "1" information previously stored in storage capacitor D of the particular stage and storage capacitor A of the next succeeding stage is shifted to storage capacitors A and B of the succeeding stage. In this manner the binary "1" information is progressively shifted from the first pair of storage capacitors of each stage to the first pair of storage capacitors of the next succeeding stage in four phases by reversing the direction of polarization of each two adjacent storage capacitors of the serially connected storage capacitors in succession. As binary "1" information is successively shifted through the respective serially connected storage capacitors from one stage to another stage, the adjacent serially connected storage capacitors are polarized in the opposite direction to correspond to binary "0's" and are thus reset in preparation for succeeding binary "1" information entered into the shift register.

The binary information stored in the shift register of the present invention may advantageously be gated out serially from the last stage or in parallel from all stages under control of the gating ferroelectric capacitors associated with the respective stages.

It is a feature of the present invention that each stage of a plural stage shift register comprise a plurality of serially connected ferroelectric capacitors utilized as storage capacitors and that the serially connected storage capacitors in each stage be connected in series with the serially connected storage capacitors of each other stage.

It is also a feature of this invention that the storage and shifting of information in the storage capacitors serially connected as indicated above be controlled by a plurality of ferroelectric capacitors utilized as gates, each of which is connected between an associated one of a plurality of drive conductors and the junction between a respective pair of adjacent serially connected storage capacitors.

It is a further feature of the present invention that the storage capacitors and the associated gating capacitors be normal ferroelectric capacitors, thus advantageously permitting the fabrication of the shift register of the present invention from a single slab of ferroelectric material.

It is an additional feature of the invention that binary information be stored in the first pair of storage capacitors in each stage and that this information be shifted to the first pair of storage capacitors in the next succeeding stage in four phases of operation by successively reversing the direction of polarization of each two succeeding adjacent serially connected storage capacitors in succession.

It is an additional feature of this invention that the information be read into the first pair of serially connected storage capacitors in each stage during the last phase of the four-phase operating cycle and that the information stored in the shift register be removed in a serial or parallel manner in the last phase of the four-phase operating cycle through the operation of the gating capacitors.

A complete understanding of these and other objects and features of the invention may be gained from a consideration of the following detailed description and the accompanying drawing, in which:

FIG. 1 is a schematic representation of one illustrative embodiment of this invention;

FIG. 2 is a graphical representation of the sequence of negative voltage pulses applied over the suitably biased control conductors to the drive circuits of the invention to control the energization of the respective drive leads; and FIG. 3 is a pictorial representation illustrative of the direction of polarization of the various ferroelectric capacitors during various phases of the four-phase operating cycle.

Referring more particularly to the drawing, FIG. 1 shows three stages, stage 1, stage 2 . . . and stage *n*, of a plural stage shift register. Each stage of the shift register has four serially connected ferroelectric capacitors, A, B, C and D, utilized as storage capacitors. The serially connected storage capacitors of each stage are connected in series with the serially connected storage capacitors of each other stage. Also, each stage, except stage 1, includes four ferroelectric capacitors, E, F, G and H, utilized as gating capacitors. Each of the stages of the shift register is connected in parallel to a pair of drive circuits 11 and 12 by four drive conductors, W, X, Y and Z. One terminal of each gating capacitor in each of the stages of the shift register is connected to the junction between two adjacent storage capacitors and to an associated one of the drive conductors. For example, gating capacitor $G_1$ in stage 1 connects drive conductor Z to the junction between storage capacitors $A_1$ and $B_1$ in stage 1. Similarly, gating capacitor G in the other stages of the shift register connect drive conductor Z to the junction between capacitors A and B in the respective stages.

Drive circuits 11 and 12 are connected to negative polarity pulse source 13 by four suitably biased control conductors 21, 22, 23 and 24, as shown. Each drive circuit comprises a pair of transistors of the PNP type and a transformer. For example, drive circuit 11 comprises transformer 9 and transistors 5 and 7. The secondary winding of transformer 9 is connected to the X and W drive conductors and the primary winding is connected to the respective collector electrodes of transistors 5 and 7. The primary winding of transformer 9 is center tapped to ground potential and the emitter electrodes of transistors 5 and 7 are connected in common to source of positive polarity potential 15. The base electrodes of transistors 5 and 7 are connected, respectively, to control conductors 21 and 23 leading to negative polarity pulse source 13. Drive circuit 12, which comprises transistors 6 and 8 and transformer 10, is similarly connected to drive conductors Y and Z, to control conductors 22 and 24, and to source of positive polarity potential 16.

The pairs of transistors in each of the drive circuits being of the PNP type are normally biased in their nonconducting condition by the voltage from sources 15 and 16, respectively, applied to the common emitter connections in association with suitably more positive direct-current biasing potential applied to conductors 21 through 24. When a negative pulse from pulse source 13 is applied to the base electrode of one of the transistors over the control conductors 21 through 24, the associated transistor being of the PNP type is placed in its conducting state. For example, when a negative pulse is applied to control conductor 21 by pulse source 13, transistor 5 is placed in its conducting condition and current will flow from source 15 through transistor 5 through the lower portion of primary winding 9 to the center tapped ground connection. Similarly, if a negative pulse is applied to conductor 23, transistor 7 will be placed in its conducting condition and a current will flow from source 15 through transistor 7 down through the upper portion of the primary winding of transformer 9 to the center tapped ground connection. Thus the direction of current flow in the primary winding of transformer 9 will depend upon which of transistors 5 and 7 is in its conducting condition. Current flow in one direction in the primary winding of transformer 9 will induce a voltage in the secondary winding which will result in a positive potential being applied to drive conductor X and a negative potential being applied to drive conductor W. Current flow in the opposite direction in the primary winding of transformer 9 will induce a voltage in the secondary winding which will result in a positive potential being applied to drive conductor W and a negative potential being applied to drive conductor X. Drive circuit 12 operates in a similar manner under control of the pulses applied to control conductors 22 and 24 from pulse source 13.

FIG. 2 illustrates the sequence of negative polarity voltage pulses from source 13 applied to the respective control conductors 21 through 24 to control the operation of drive circuits 11 and 12 and obtain the four-phase operating cycle in accordance with the present invention. Thus during phase 1 a negative pulse is applied to control conductor 21 which turns on transistor 5 and results in a positive potential being applied to drive conductor W and a negative potential being applied to drive conductor X. During phase 1 there are no voltage pulses applied to conductor 22 or 24 connected to drive circuit 12 and hence transistors 6 and 8 remain in their nonconducting condition. With both transistors 6 and 8 in drive circuit 12 in their nonconducting condition, a high impedance is placed across conductors Y and Z. During phase 2 a negative voltage pulse is applied to conductor 22 which turns on transistor 6 in drive circuit 12 and results in a positive potential being applied to drive conductor Y and a negative potential being applied to drive conductor Z. Similarly, during phase 2 transistors 5 and 7 in drive circuit 11 are in their nonconducting condition and a high impedance is placed across drive conductors X and W. Phase 3 and phase 4 are similar to phases 1 and 2 except that the polarities of the potentials applied to respective conductors W, X, Y and Z are reversed from those applied during phase 1 and phase 2.

A description of the operation of the ferroelectric shift register of the present invention will be given with reference to FIG. 3 which shows the state of all of the ferroelectric capacitors, both storage and gating, during various phases of the four-phase operating cycle. These phases are indicated by the numerals 1, 2, 3 and 4, at the left of FIG. 3. Thus the state of the ferroelectric capacitors of the shift register is shown two times for phase 4 at (*a*) and (*e*) and once for each of the intervening phases 1, 2 and 3 at (*b*), (*c*) and (*d*), respectively. The ferroelectric capacitors in the respective stages of the shift register are indicated across the top of FIG. 3 by the letters $A_1$, $G_1$ . . ., $E_2$, $A_2$ . . ., and $E_n$, $A_n$ . . . . The direction of polarization of each of the ferroelectric capacitors is shown by an arrow with the direction of the arrowhead indicating the polarization of the ferroelectric capacitors in the direction of ordinary current flow before the pulsing of the particular phase in which the arrow appears. Thus, when the arrow indicating the direction of polarization of capacitor $A_1$, for example, points to the right as shown at (*a*) in FIG. 3, if the voltage applied during a particular phase in which the arrow appears (phase 4 in this example) is such that the current would tend to flow from right to left the direction of polarization of capacitor $A_1$ will be reversed and current will flow therethrough. On the other hand, if a voltage of opposite polarity is applied to capacitor $A_1$, because capacitor $A_1$ is already polarized in the direction that current tends to flow no reversal of polarization occurs and no current will flow therethrough. Directly to the right of the numeral indicating the operating phase in FIG. 3 are indications of the potential polarities applied to the respective drive conductors W, X, Y and Z by drive circuits 11 and 12 during the respective phases. For example, in phase 4 shown in (*a*) and (*e*) in FIG. 3, a negative potential is applied to the Y drive conductor and a positive potential is applied to the Z drive conductor. The dotted lines enclosing pairs of arrows in FIG. 3 indicate the respective pairs of storage capacitors which store binary information.

As indicated hereinbefore, binary "0" information is stored in the shift register of the present invention by polarizing an adjacent pair of storage capacitors to opposite directions, and binary "1" information is stored by polarizing an adjacent pair of storage capacitors in the same direction. Thus, for example, as shown at (*b*) in FIG. 3 corresponding to phase 1 of the operating cycle, storage capacitors $A_1$ and $B_1$ are polarized in the same direction to indicate the storage of a binary "1." Likewise, capacitors $A_2$ and $B_2$ of stage 2 are polarized in the same direction to indicate the storage of a binary "1." On the other hand, capacitors $A_n$ and $B_n$ in stage *n* are polarized in opposite directions to indicate the storage of a binary "0."

As indicated hereinbefore, binary "1" information is entered into the shift register of the present invention by polarizing the first storage capacitor of the first pair in stage 1 in the same direction as the second storage capacitor of the first pair in stage 1, thus making the direction of polarization of the first pair of storage capacitors $A_1$ and $B_1$ of stage 1 the same. This entry of information in the shift register is accomplished by information input circuit 20 which, as shown in FIG. 1, comprises an input terminal $P_1$ connected through a reverse breakdown diode 26 to storage capacitor $A_1$ in stage 1. Resistor 25 is connected between input terminal $P_1$ and ground and a conventional diode 27 is connected in the same manner as gating capacitors $E_2$ . . . $E_n$ in the other stages from drive conductor W to the junction between reverse breakdown diode 26 and storage capacitor $A_1$. A reverse breakdown diode, as distinguished from a conventional diode, conducts current readily in the reverse direction above a predetermined breakdown potential. Thus breakdown diode 26 normally blocks the path of current flow through storage capacitors $A_1$ and resistance 25 to ground. However, if a negative input pulse (representing a binary "1") is applied to input terminal $P_i$ during the time that the positive potential is applied to drive conductor Z in phase 4, which negative pulse is sufficient to bring the potential applied across breakdown diode 26 above the breakdown potential, current will flow in the reverse direction through diode 26. Thus with capacitors $G_1$ and $A_1$ polarized in the directions shown at (*a*) in FIG. 3, current will flow from drive conductor Z, through capacitors $G_1$ and $A_1$, through breakdown diode 26 and through resistance 25 to ground. This positive potential applied to capacitors $G_1$ and $A_1$ from drive conductor Z will cause these capacitors to reverse their direction of polarization to that shown at (*b*) in FIG. 3. With the reversal of the direction of polarization of capacitor $A_1$, it now corresponds to the direction of polarization of capacitor $B_1$ as shown at (*b*) in FIG. 3 and hence binary "1" information has been stored in capacitors $A_1$ and $B_1$ in stage 1 of the shift register during phase 4 of the operating cycle. It is readily apparent that, if during phase 4 of the operating cycle no input pulse is applied to input terminal $P_i$, no current will flow through breakdown diode 26 and capacitors $G_1$ and $A_1$ will not reverse their direction of polarization. As a result, capacitors $A_1$ and $B_1$ will be polarized in opposite directions to correspond to a binary "0." Conventional diode 27 connected to drive conductor W prevents any current flowing through capacitors $G_1$ and $A_1$ from flowing through drive conductor W to the other gating capacitors of the shift register.

The manner in which the binary "1" information, stored in storage capacitors $A_1$, $B_1$ of stage 1 of the shift register during phase 4 of the operating cycle as described above, is shifted to storage capacitors $A_2$ and $B_2$ of stage 2 in a four-phase operating cycle will now be described. During this description the change of polarization of the ferroelectric capacitors in the remaining stages of the shift register will be ignored and will be dealt with later. Thus, as shown at (*b*) in FIG. 3 during phase 1 of the four-phase operating cycle, a positive potential is applied to drive conductor W and a negative potential is applied to drive conductor X. As shown in FIG. 1, diode 27 is poled in the forward direction to the positive potential applied to drive conductor W and will conduct current readily and, furthermore, because ferroelectric capacitors $A_1$, $B_1$ and $F_1$ are polarized in the direction as shown at (*b*) in FIG. 3 these capacitors will reverse their direction of polarization in response to the application of the positive potential to drive conductor W and the negative potential to drive conductor X. It will be noted that capacitor $C_1$ is polarized in the direction of the current flow from drive conductor W and hence blocks current flow to the subsequent capacitors $H_1$ or $D_1$ of stage 1. After the application of the positive potential to drive conductor W and negative potential to drive conductor X during phase 1, the direction of polarization of capacitors $A_1$, $B_1$ and $F_1$ is as shown at (*c*) in FIG. 3. It will be noted that the direction of polarization of capacitor $B_1$ is the same as the direction of polarization of capacitor $C_1$, and hence the binary "1" information previously stored in capacitors $A_1$ and $B_1$ is effectively shifted to capacitors $B_1$ and $C_1$ of stage 1.

In phase 2 of the operating cycle as indicated at (*c*) in FIG. 3, a positive potential is applied to drive conductor Y and a negative potential is applied to drive conductor Z. Because capacitors $G_1$, $B_1$, $C_1$ and $H_1$ are polarized in the same direction and opposite to the direction that current would tend to flow from drive conductor Y to drive conductor Z, the direction of polarization of these capacitors will be reversed as is shown at (*d*) in FIG. 3. With the reversal of polarization of capacitors $B_1$ and $C_1$ in response to the potential applied to drive conductors Y and Z during phase 2, it will be noted that capacitor $C_1$ is polarized in the same direction as capacitor $D_1$ and hence the binary "1" information previously stored in capacitors $B_1$ and $C_1$ is effectively shifted to capacitors $C_1$ and $D_1$.

In phase 3 of the operating cycle as indicated at (*d*) in FIG. 3, a negative potential is applied to drive conductor W and a positive potential is applied to drive conductor X. Capacitors $F_1$, $C_1$ and $D_1$ of stage 1 and $E_2$ of stage 2 are polarized in the same direction, which opposes the direction that current will tend to flow. Hence, when the aforementioned potentials are applied to drive conductors W and X, the direction of polarization of these capacitors will be reversed as is shown at (*e*) in FIG. 4. When capacitor $D_1$ has reversed its direction of polarization it will correspond to the direction of polarization of capacitors $A_2$ in stage 2 and thus the binary "1" information previously stored in capacitors $C_1$ and $D_1$ of stage 1 is effectively transferred to capacitor $D_1$ of stage 1 and capacitor $A_2$ of stage 2.

When a negative potential is applied to the Y drive conductor and a positive potential is applied to the Z drive conductor during phase 4, the binary "1" information stored in capacitors $D_1$ of stage 1 and $A_2$ of stage 2, as is shown at (*e*) of FIG. 3, will be shifted to capacitors $A_2$ and $B_2$ of stage 2. It will be noted that capacitors $H_1$ and $D_1$ of stage 1 and $A_2$ and $G_2$ of stage 2 are all polarized in the same direction, which opposes the direction that current tends to flow, and as a result the direction of polarization of these capacitors will be reversed. Thus it has been shown that the binary "1" information stored in capacitors $A_1$ and $B_1$ of stage 1 during phase 4 of an operating cycle is advanced step by step through the serially connected ferroelectric capacitors in four phases until it is stored in capacitors $A_2$ and $B_2$ of stage 2. It is pointed out that once the binary "1" information has been shifted out of an adjacent pair of storage capacitors, in the manner described above, the pairs of storage capacitors are polarized in opposite directions to represent a binary "0" as shown in (*d*) at FIG. 3, where storage capacitors $A_1$ and $B_1$ are polarized oppositely when the binary "1" information previously contained therein was shifted to capacitors $C_1$ and $D_1$. Thus as binary "1" information is shifted from stage to stage in the shift register, the pairs of ferroelectric capacitors are reset in preparation for receiving new binary "1" information entered into the shift register.

As shown at (*a*) in FIG. 3, binary "1" information is also stored in capacitors $D_1$ of stage 1 and $A_2$ of stage 2, which information is shifted to capacitors $A_2$ and $B_2$ of stage 2 at the same time that the new binary "1" information was entered into capacitors $A_1$ and $B_1$ of stage 1 during phase 4 of the operating cycle. The shifting of this binary "1" information into capacitors $A_2$ and $B_2$ of stage 2 and the subsequent shifting thereof to capacitors $A_n$ and $B_n$ of the next stage are accomplished simultaneously and in the same manner as the step by step shifting of the binary "1" information originally inserted in stage 1 as described above.

As shown at (*a*) in FIG. 3, binary "0" information is also stored in capacitor $D_2$ of stage 2 and capacitor $A_n$ of stage *n*. In response to the application of the negative potential to the Y drive conductor and the positive potential to the Z drive conductor during phase 4, no reversal of polarization of these two capacitors can occur because the current which would tend to flow from the positive potential on the Z conductor will be blocked by capacitor $D_2$ since it already is polarized in the direction in which current would tend to flow. Hence no reversal of polarization of capacitors $D_2$ of stage 2 and $A_n$ of stage *n* takes place.

Binary "0" information is represented in the shift register of the present invention by the opposite polarization of an adjacent pair of ferroelectric storage capacitors, and it is obvious that no polarization changes will take place during any of the phases of the operating cycle because, regardless of the polarity of the potential applied across the pair, one or the other will always be poled in the direction in which current would tend to flow and hence would block current flow. Accordingly, no shifting of binary "0" information occurs during the four phases and the direction of polarization of such storage capacitors representing binary "0" information remains unaltered.

In accordance with one aspect of the invention, binary information stored in the shift register of the present invention may advantageously be read out in series or in parallel during phase 4 of the operating cycle. As shown in FIG. 1, each of the gating capacitors H is connected in series with a resistance R to the Y drive conductor. For example, resistance $R_1$ is connected in series with gating capacitor $H_1$ between drive conductor Y and the junction between storage capacitors $C_1$ and $D_1$ in stage 1. Thus, during phase 4 when a positive potential is applied to drive conductor Z, if a binary "1" is stored in storage capacitors $D_1$ of stage 1 and $A_2$ of stage 2 as described above, the current flow from the positive potential on conductor Z through capacitors $G_2$, $A_2$, $D_1$ and $H_1$ will also flow through resistance $R_1$ to provide a potential which is positive with respect to ground. This potential is available from output terminal $P_1$ connected to the upper terminal of resistance $R_1$ and gives an indication that a binary "1" was present in stage 1 and was shifted to stage 2 during phase 4 of the operating cycle. In the event that a binary "0" was stored in capacitors $D_1$ of stage 1 and $A_2$ of stage 2, as is the case for capacitors $D_2$ of stage 2 and $A_n$ of stage $n$ shown at (*a*) in FIG. 3, no current flow will occur and accordingly no output signal voltage will be obtained. Thus the binary information stored in the shift register of the present invention may advantageously be read out serially from terminal $P_n$ connected in the last stage of the shift register or in parallel from terminals $P_1, P_2 \ldots P_n$ connected in each stage of the shift register.

The clearing of the shift register of the present invention in preparation for receiving new binary information applied to input terminal $P_i$ may be accomplished in one of two ways. Advantageously, a binary "1" may be inserted in stage 1 and this binary "1" shifted through the entire shift register which, as indicated above, will cause the resetting of the respective pairs of adjacent registers in opposite directions of polarization to represent binary "0's."

This resetting of respective pairs of adjacent registers in opposite directions is also accomplished by applying $n$ shifting cycles to an $n$ stage shift register without inserting the initial or further binary "1's" during these $n$ shifting cycles. Alternatively, the shift register of the present invention may be cleared in preparation for receiving new binary information by applying ground potential to drive conductors Y and Z and simultaneously applying a pulse of positive polarity to drive conductors W and X. This will have the effect of polarizing all of the gating ferroelectric capacitors to the down direction as shown in FIG. 3 and polarizing the adjacent storage capacitors A, B and C, D, et cetera, in opposite directions to represent the storage of binary "0's."

As described hereinbefore, the normal operating cycle of sequences of the four phases (1, 2, 3, 4, 1, et cetera) will cause information to be shifted from left to right in the shift register of the present invention. If the reverse sequence of drive phases is used (4, 3, 2, 1, 4, et cetera), information will be shifted from right to left. Information may also advantageously be shuttled in place by cyclically repeating certain operating phases. For example, in cases where quasi-static readout is wanted the phase sequence 1, 3, 1, 3, et cetera, or 2, 4, 2, 4, may be used.

During the application of the voltage pulses to one set of drive leads the other set is effectively open circuited. As indicated hereinbefore, transformers in the drive circuits which are not energized have open circuited primaries and effectively place a high impedance across the associated drive conductors. Thus, for example, when potential is being applied to drive conductors X and W by the operation of drive circuit 11, a high impedance is applied across drive conductors Y and Z because neither transistor 6 nor 8 in drive circuit 12 is in the conducting condition and the primary winding of transformer 10 therein is effectively open circuited.

It is to be understood that the above-described arrangements are illustrative of the application of the principles of the invention. Numerous other arrangements may be devised by those skilled in the art without departing from the spirit and scope of the invention.

What is claimed is:

1. A shift register circuit comprising a plurality of normal ferroelectric capacitors connected directly to each other in a continuous series circuit, means for initially polarizing adjacent ones of said capacitors in opposite directions of polarization, means for introducing binary information into said register comprising means for polarizing a pair of adjacent ones of said capacitors in the same direction of polarization, and means for shifting said information along said register, said last-named means comprising means for reversing the direction of polarization of said pair of capacitors and means for successively reversing the direction of polarization of each succeeding two adjacent capacitors of said serially connected capacitors in succession where each said succeeding two adjacent capacitors includes one capacitor of the immediately preceding pair.

2. A shift register circuit comprising in combination a plurality of normal ferroelectric capacitors connected directly to each other in a continuous series circuit, means for initially polarizing adjacent ones of said capacitors in opposite directions of polarization, means for storing binary information in a pair of adjacent ones of said capacitors comprising means for reversing the direction of polarization of one of said capacitors of said pair to correspond to the direction of polarization of the other of said capacitors of said pair, and means for shifting said information along said register comprising means for successively reversing the direction of polarization of each two adjacent capacitors of said serially connected capacitors in succession where each said succeeding two adjacent capacitors includes one capacitor of the immediately preceding pair.

3. In a shift register circuit the combination comprising a plurality of normal ferroelectric capacitors connected directly to each other in a continuous series circuit, means for initially polarizing adjacent ones of said capacitors in opposite directions of polarization, means for storing binary information in a pair of adjacent ones of said capacitors comprising means for reversing the direction of polarization of a first one of said capacitors of said pair to correspond to the direction of polarization of the second one of said capacitors of said pair, and means for shifting said information in said register comprising means for polarizing said first one of said capacitors and said second one of said capacitors in the direction of polarization of a third one of said capacitors adjacent thereto and means for polarizing said second one of said capacitors and said third one of said capacitors in the direction of polarization of a fourth one of said capacitors adjacent to said third one of said capacitors.

4. The shift register circuit comprising a plurality of normal ferroelectric storage capacitors connected directly to each other in a continuous series circuit, a plurality of gating means, a plurality of drive conductors, a source of control signals, means connecting each of said gating means between a respective one of said drive conductors and the circuit junction between a respective pair of adjacent ones of said storage capacitors, means for storing binary information in a first pair of adjacent ones of said storage capacitors by polarizing in particular directions said first pair of capacitors, and means including said gating means, said drive conductors and said source for shifting said binary information from said first pair of storage capacitors to a second pair of adjacent ones of said storage capacitors where said second pair includes one capacitor of said first pair by causing the polarization of said second pair to be in selected directions, and by reversing the polarization of said one capacitor of said first pair.

5. The combination defined in claim 4 wherein further is provided means including said gating means for initially polarizing in opposite directions series adjacent ones of said storage capacitors and wherein said storing means includes one of said gating means and effective to cause polarizing of said first pair of storage capacitors in the same direction of polarization.

6. The combination defined in claim 5 wherein each of said gating means comprises a ferroelectric gating capacitor.

7. The combination defined in claim 6 wherein said ferroelectric gating capacitors are normal ferroelectric capacitors.

8. The combination defined in claim 7 further comprising means including one of said gating capacitors responsive to the shifting of said information between a predetermined two of said succeeding pairs of storage capacitors for providing an output signal representing said information.

9. The shift register circuit comprising a plurality of normal ferroelectric storage capacitors connected directly to each other in a continuous series circuit, a plurality of gating means, a plurality of drive conductors, means connecting each of said gating means between a respective one of said drive conductors and the junction between a respective pair of adjacent ones of said storage capacitors, means for storing binary information in a first pair of adjacent ones of said storage capacitors by particularly polarizing said first pair, a source of pulses, and means responsive to pulses from said source for cyclically applying drive pulses of predetermined polarity in a predetermined sequence to said drive conductors to shift successively said information from said first pair of storage capacitors to succeeding pairs of adjacent ones of said storage capacitors where each said succeeding pair includes one capacitor of an immediately preceding pair by successively reversing the polarization of said one capacitor and successively selectively polarizing the other capacitor of each succeeding pair.

10. An electrical circuit comprising a plurality of normal ferroelectric capacitors connected directly to each other in a continuous series circuit, and means for polarizing in a predetermined sequence successive adjacent ones of said capacitors in opposite directions of polarization, said means including a second plurality of normal ferroelectric capacitors, means connecting each of said second plurality of ferroelectric capacitors to a respective junction between an adjacent two of said serially connected capacitors, and means for applying pulses to predetermined ones of said second plurality of capacitors in said predetermined sequence.

11. The invention defined in claim 10 further comprising means for introducing information into said electrical circuit comprising means for polarizing in the same direction of polarization a first pair of adjacent ones of said serially connected capacitors.

12. The invention defined in claim 11 wherein said introducing means comprises a unidirectional current device and a reverse breakdown current device both connected to a first one of said first pair of said serially connected capacitors.

13. The invention defined in claim 12 further comprising resistance means interconnected between particular ones of said second plurality of capacitors and particular ones of said drive conductors whereby information is derived as signals across said resistance means from particular pairs of said serially connected capacitors during particular phases of said predetermined sequence.

14. In a shift register circuit the combination comprising a plurality of normal ferroelectric storage capacitors connected directly to each other in a continuous series circuit, a plurality of normal ferroelectric gating capacitors, two pairs of drive conductors, means connecting each of said gating capacitors between a respective one of said drive conductors of said two pairs and the circuit junction between a respective pair of series adjacent ones of said storage capacitors, a pair of drive means each connected to a respective pair of said drive conductors, a control means, and means connecting said control means to each of said drive means, said control means effective to cause said drive means to selectively apply in predetermined phases a first polarity potential, a second polarity potential, and a high impedance across the pair of drive conductors connected thereto to cause in each phase such polarization of a series adjacent pair of storage capacitors so that the polarization of one of said latter pair is reversed in direction from its polarization state in the next previous phase and so that the other of said latter pair is in the same direction as said one capacitor.

References Cited in the file of this patent

UNITED STATES PATENTS

| | | |
|---|---|---|
| 2,666,195 | Bachelet | Jan. 12, 1954 |
| 2,839,739 | Anderson | June 17, 1958 |
| 2,959,687 | Eckert | Nov. 8, 1960 |